US011207976B2

(12) United States Patent
Ghatti et al.

(10) Patent No.: US 11,207,976 B2
(45) Date of Patent: Dec. 28, 2021

(54) AXLE ASSEMBLY HAVING A MULTI-SPEED COUNTERSHAFT TRANSMISSION

(71) Applicant: ArvinMeritor Technology, LLC, Troy, MI (US)

(72) Inventors: Chetankumar Ghatti, Troy, MI (US); Rodrigo Soffner, Osasco (BR); Christopher Keeney, Troy, MI (US); Mark Smith, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 16/594,362

(22) Filed: Oct. 7, 2019

(65) Prior Publication Data

US 2021/0101478 A1    Apr. 8, 2021

(51) Int. Cl.
| | | |
|---|---|---|
| *B60K 6/26* | (2007.10) |
| *B60K 17/04* | (2006.01) |
| *B60K 1/00* | (2006.01) |
| *B60K 17/16* | (2006.01) |
| *F16H 3/093* | (2006.01) |
| *F16H 3/097* | (2006.01) |
| *F16H 37/04* | (2006.01) |
| *F16H 3/095* | (2006.01) |

(52) U.S. Cl.
CPC .............. *B60K 17/043* (2013.01); *B60K 1/00* (2013.01); *B60K 17/165* (2013.01); *F16H 3/093* (2013.01); *F16H 3/097* (2013.01); *F16H 37/042* (2013.01); *B60K 2001/001* (2013.01); *F16H 3/095* (2013.01); *F16H 2702/04* (2013.01)

(58) Field of Classification Search
CPC .......... F16H 3/093; F16H 3/095; F16H 3/097; F16H 2702/04; F16H 2700/04; B60K 6/36; B60K 2001/001; B60K 17/043; B60K 17/16; B60K 17/165
USPC .................................................... 74/330, 331
See application file for complete search history.

(56) References Cited

U.S. PATENT DOCUMENTS 1,981,236 A * 11/1934 Logue .................... F16H 3/095
                                                                74/375
2,338,154 A     1/1944 Wilkinson
(Continued)

FOREIGN PATENT DOCUMENTS

DE    2005047 A1    8/1971
DE    3036465 A1    5/1982
(Continued)

OTHER PUBLICATIONS

Dhanapal Vittala Raya, et al., U.S. Appl. No. 16/205,586, filed with the United States Patent and Trademark Office on Nov. 30, 2018.
(Continued)

*Primary Examiner* — Charles A Fox
*Assistant Examiner* — Farhana Pervin
(74) *Attorney, Agent, or Firm* — Brooks Kushman PC

(57) ABSTRACT

An axle assembly having a countershaft transmission. The countershaft transmission may operatively connect an electric motor to a drive pinion. The countershaft transmission may have a first countershaft subassembly that is rotatable about a first countershaft axis and a second countershaft subassembly that is rotatable about a second countershaft axis.

20 Claims, 5 Drawing Sheets

(56) References Cited

U.S. PATENT DOCUMENTS

| | | | |
|---|---|---|---|
| 4,304,152 A | 12/1981 | Michling | |
| 5,603,671 A | 2/1997 | Schmidt | |
| 6,176,146 B1* | 1/2001 | Ore | F16H 3/095 74/330 |
| 6,216,560 B1 | 4/2001 | Takada et al. | |
| 7,530,912 B2 | 5/2009 | Kramer | |
| 7,798,937 B2* | 9/2010 | Gitt | F16H 3/0915 475/302 |
| 8,858,379 B2 | 10/2014 | Keeney et al. | |
| 2003/0125150 A1 | 7/2003 | Tanzer | |
| 2005/0124450 A1 | 6/2005 | Gady et al. | |
| 2005/0176543 A1 | 8/2005 | Kirkwood et al. | |
| 2005/0187058 A1 | 8/2005 | Teraoka | |
| 2006/0094552 A1 | 5/2006 | Duncan | |
| 2007/0275816 A1 | 11/2007 | Henderson | |
| 2008/0146396 A1 | 6/2008 | Millar | |
| 2010/0000807 A1 | 1/2010 | Rodriguez et al. | |
| 2010/0294057 A1* | 11/2010 | Sowul | F16H 3/006 74/330 |
| 2011/0111910 A1* | 5/2011 | Ideshio | B60K 6/36 475/5 |
| 2012/0053011 A1* | 3/2012 | Onomura | B60L 15/2054 477/3 |
| 2012/0238387 A1 | 9/2012 | Stuart | |
| 2013/0005526 A1 | 1/2013 | Matsubara et al. | |
| 2013/0017927 A1 | 1/2013 | Morscheck et al. | |
| 2013/0296094 A1 | 11/2013 | Mack et al. | |
| 2013/0345018 A1* | 12/2013 | Kaltenbach | B60K 6/48 477/5 |
| 2014/0087906 A1 | 3/2014 | Keeney et al. | |
| 2014/0262675 A1 | 9/2014 | Sugiyama et al. | |
| 2014/0274529 A1 | 9/2014 | Edler et al. | |
| 2014/0311266 A1* | 10/2014 | Nakashima | F16H 61/688 74/331 |
| 2015/0151634 A1 | 6/2015 | Smetana | |
| 2015/0330492 A1 | 11/2015 | Lee et al. | |
| 2016/0017958 A1 | 1/2016 | Wu et al. | |
| 2016/0053880 A1 | 2/2016 | Peura | |
| 2017/0057349 A1 | 3/2017 | Ogawa et al. | |
| 2017/0059007 A1* | 3/2017 | Eo | F16H 3/093 |
| 2018/0015816 A1* | 1/2018 | Robinette | F16H 37/0806 |
| 2018/0112770 A1* | 4/2018 | Hansson | F16H 61/688 |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |

FOREIGN PATENT DOCUMENTS

| | | | |
|---|---|---|---|
| DE | 4120262 A1 | 5/1992 | |
| DE | 41 29 231 A1 | 3/1993 | |
| DE | 19827756 A1 | 12/1999 | |
| DE | 19915926 A1 | 3/2000 | |
| DE | 19952625 A1 | 6/2001 | |
| DE | 10049197 A1 | 4/2002 | |
| DE | 10226572 A1 | 1/2004 | |
| DE | 102004038882 A1 | 3/2005 | |
| DE | 102010061217 A1 | 6/2012 | |
| DE | 102011007253 A1 | 10/2012 | |
| DE | 102011007257 A1 | 10/2012 | |
| DE | 102011007268 A1 | 10/2012 | |
| DE | 10 2017 121540 B3 | 11/2018 | |
| EP | 0677414 A2 | 10/1995 | |
| EP | 1512884 A2 * | 3/2005 | B60W 20/00 |
| EP | 2444265 A1 | 4/2012 | |
| JP | S57059124 U | 4/1982 | |
| JP | H04185207 A | 7/1992 | |
| JP | 2003019911 A | 1/2003 | |
| WO | 2013029682 A1 | 3/2013 | |
| WO | 2016/077306 A1 | 5/2016 | |
| WO | 2016132800 A1 | 8/2016 | |
| WO | 2017114423 A1 | 7/2017 | |

OTHER PUBLICATIONS

Mark Smith, et al., U.S. Appl. No. 16/205,623, filed with the United States Patent and Trademark Office on Nov. 30, 2018.

Mark Smith, et al., U.S. Appl. No. 16/206,182, filed with the United States Patent and Trademark Office on Nov. 30, 2018.

Rodrigo Soffner, et al., U.S. Appl. No. 16/205,663, filed with the United States Patent and Trademark Office on Nov. 30, 2018.

Angel Begov, et al., U.S. Appl. No. 16/205,717, filed with the United States Patent and Trademark Office on Nov. 30, 2018.

Mark Smith, et al., U.S. Appl. No. 16/205,771, filed with the United States Patent and Trademark Office on Nov. 30, 2018.

Tao Peng, et al., U.S. Appl. No. 16/205,850, filed with the United States Patent and Trademark Office on Nov. 30, 2018.

Chetankumar Ghatti, et al., U.S. Appl. No. 16/594,702, filed with the United States Patent and Trademark Office on Oct. 7, 2019.

Chetankumar Ghatti, et al., U.S. Appl. No. 16/594,932, filed with the United States Patent and Trademark Office on Oct. 7, 2019.

Chetankumar Ghatti, et al., U.S. Appl. No. 16/594,875, filed with the United States Patent and Trademark Office on Oct. 7, 2019.

Extended European Search Report dated Mar. 3, 2021 for related European Patent App. No. 20197280.9; 16 pages.

* cited by examiner

AXLE ASSEMBLY HAVING A MULTI-SPEED COUNTERSHAFT TRANSMISSION

TECHNICAL FIELD

This disclosure relates to an axle assembly having a multi-speed countershaft transmission that may operatively connect an electric motor to a drive pinion.

BACKGROUND

An axle assembly having an electric motor module is disclosed in U.S. Patent Publication No. 2019/0054816.

SUMMARY

In at least one embodiment, an axle assembly is provided. The axle assembly may include an electric motor, a drive pinion, and a countershaft transmission. The drive pinion may be rotatable about a first axis. The countershaft transmission may operatively connect the electric motor to the drive pinion. The countershaft transmission may have a first countershaft subassembly that is rotatable about a fit countershaft axis and a second countershaft subassembly that is rotatable about a second countershaft axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
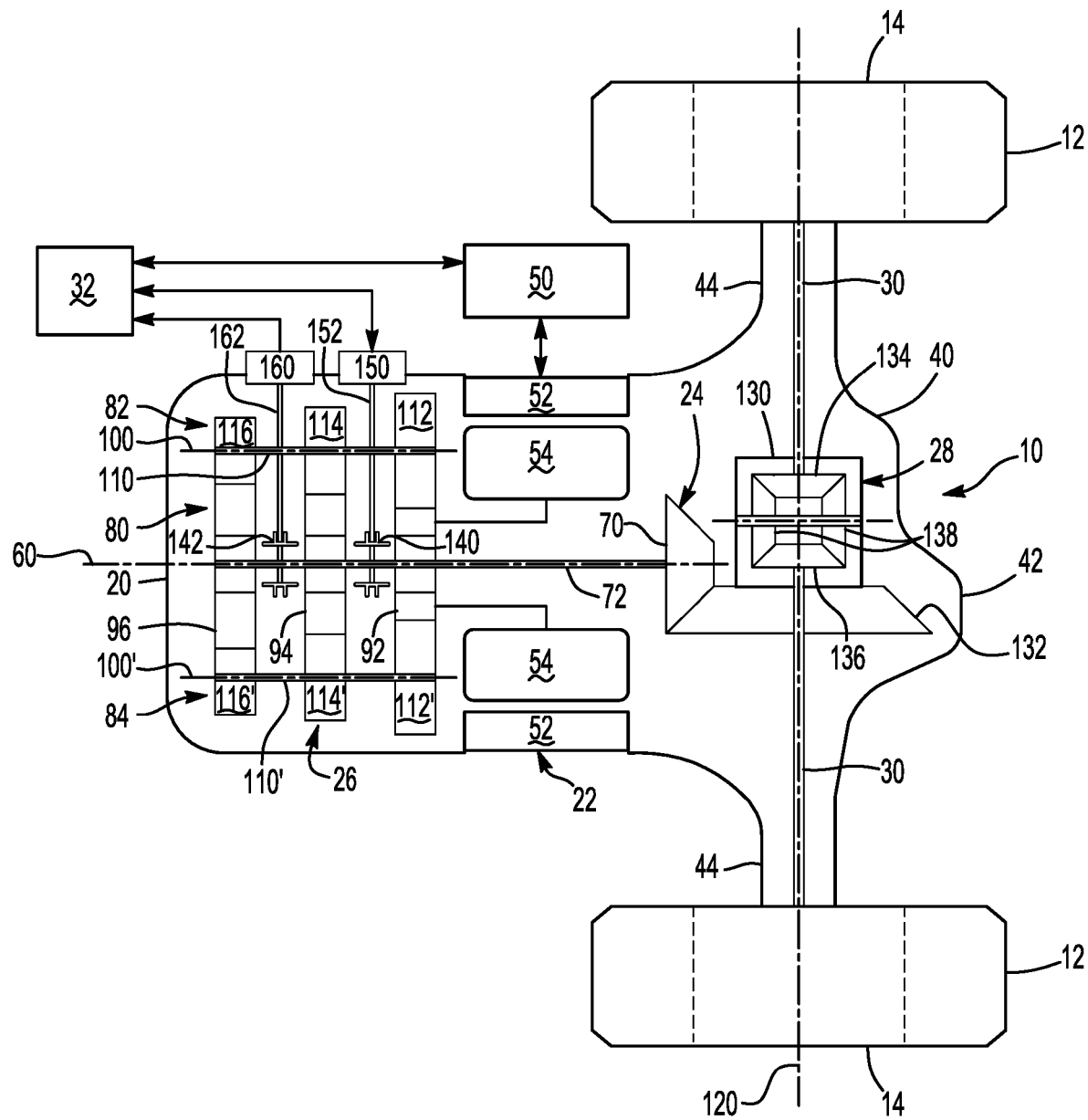
FIG. 1 shows an example of an axle assembly having a countershaft transmission in a neutral position.

Referring to FIG. 1, an example of an axle assembly 10 is shown. The axle assembly 10 may be provided with a motor vehicle like a car, truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire 12 mounted on a wheel 14. One or more axle assemblies may be provided with the vehicle. In at least one configuration, the axle assembly 10 may include a housing assembly 20, an electric motor 22, a drive pinion 24, a countershaft transmission 26, a differential assembly 28, at least one axle shaft 30, and a control system 32.

The housing assembly 20 may facilitate mounting of the axle assembly 10 to the vehicle. In addition, the housing assembly 20 may receive various components of the axle assembly 10. For example, the housing assembly 20 may receive and support the electric motor 22, the drive pinion 24, the countershaft transmission 26, the differential assembly 28, the axle shafts 30, or combinations thereof. In at least one configuration, the housing assembly 20 may include an axle housing 40 that may have a center portion 42 and one or more arm portions 44.

The center portion 42 may be disposed proximate the center of the housing assembly 20. The center portion 42 may at least partially define a cavity that may receive the differential assembly 28. The center portion 42 may be made of one or more components and may facilitate mounting of a differential carrier that supports the differential assembly 28. A lower region of the center portion 42 may at least partially define a sump portion that may contain lubricant that may be splashed to lubricate internal components of the axle assembly 10, such as the differential assembly 28 and associated bearings. The center portion 42 may also facilitate mounting of various external components. For instance, the center portion 42 may facilitate mounting of the electric motor 22 to the housing assembly 20.

One or more arm portions 44 may extend from the center portion 42. For example, two arm portions 44 may extend in opposite directions from the center portion 42 and away from the differential assembly 28. The arm portions 44 may have substantially similar configurations. For example, the arm portions 44 may each have a hollow configuration or tubular configuration that may extend around a corresponding axle shaft 30 and may help separate or isolate the axle shaft 30 from the surrounding environment. An arm portion 44 or a portion thereof may be integrally formed with the center portion 42. Alternatively, an arm portion 44 may be separate from the center portion 42. In such a configuration, each arm portion 44 may be attached to the center portion 42 in any suitable manner, such as by welding or with one or more fasteners. Each arm portion 44 may define an arm cavity that may receive a corresponding axle shaft 30. It is also contemplated that the arm portions 44 may be omitted.

The electric motor 22 may provide torque to the differential assembly 28 via the drive pinion 24 and the countershaft transmission 26. In addition, the electric motor 22 may be electrically connected to an electrical power source 50, such as a battery, capacitor, or the like. An inverter may electrically connect the electric motor 22 and the electrical power source 50. The electric motor 22 may have any suitable configuration. In at least one configuration, the electric motor 22 may include a stator 52 and a rotor 54.

The stator 52 may be fixedly positioned with respect to the housing assembly 20. For example, the stator 52 may extend around a first axis 60 and may not rotate about the first axis 60. The stator 52 may include windings that may be electrically connected to the electrical power source 50.

The rotor 54 may extend around the first axis 60 and may be received inside the stator 52. The rotor 54 may be rotatable about the first axis 60 with respect to the stator 52. For example, the rotor 54 may be spaced apart from the stator 52 and may include magnets or ferromagnetic material that may facilitate the generation of electrical current. The rotor 54 may be operatively connected to the countershaft transmission 26 as will be discussed in more detail below.

The drive pinion 24 may be at least partially received in the housing assembly 20. The drive pinion 24 may be operatively connected to the electric motor 22. As such, the drive pinion 24 may help operatively connect the electric motor 22 to components of the axle assembly 10 like the differential assembly 28. The drive pinion 24 may extend along and may be rotatable about a first axis 60. The drive pinion 24 may be indirectly connected to the electric motor 22 via the countershaft transmission 26. In at least one configuration, the drive pinion 24 may include a gear portion 70 and a shaft portion 72.

The gear portion 70 may be disposed at or near an end of the drive pinion 24. The gear portion 70 may have a plurality of teeth that may mate or mesh with corresponding teeth on a ring gear of the differential assembly 28 as will be discussed in more detail below. As such, the drive pinion 24 may provide torque from the electric motor 22 to the ring gear.

The shaft portion 72 may extend along and may be rotatable about the first axis 60. The shaft portion 72 may be operatively connected to the countershaft transmission 26 and may extend from the gear portion 70 in a direction that may extend toward the electric motor 22 and the countershaft transmission 26. The shaft portion 72 may be integrally formed with the gear portion 70 or may be provided as a separate component that may be fixedly coupled to the gear portion 70.

The countershaft transmission 26 may operatively connect the electric motor 22 to the drive pinion 24. In at least one configuration, the countershaft transmission 26 may include a set of drive pinion gears 80, a first countershaft subassembly 82, and a second countershaft subassembly 84.

The set of drive pinion gears 80 may include a plurality of gears that may be selectively coupled to the drive pinion 24. In the configuration shown, the set of drive pinion gears 80 includes a first gear 92, a second gear 94, and a third gear 96; however, it is to be understood that a greater or lesser number of gears may be provided. A member of the set of drive pinion gears 80 may be rotatable about the first axis 60 with the drive pinion 24 when that gear is coupled to the drive pinion 24. Conversely, the drive pinion 24 may be rotatable about the first axis 60 with respect to a member of the set of drive pinion gears 80 that is decoupled from or not coupled to the drive pinion 24. A member of the set of drive pinion gears 80 may be selectively coupled to the drive pinion 24 in any suitable manner, such as with a clutch as will be discussed in more detail below. In at least one configuration, no more than one gear of the set of drive pinion gears 80 may be coupled to the drive pinion 24 at the same time when the drive pinion 24 rotates about the first axis 60.

The first gear 92 may receive the shaft portion 72 of the drive pinion 24. For example, the first gear 92 may have a through hole through which the shaft portion 72 may extend. The first gear 92 may extend around the first axis 60 and the shaft portion 72 and may have a plurality of teeth that may be arranged around and may face away from the first axis 60. The teeth of the first gear 92 may contact and may mate or mesh with teeth of a first countershaft gear that may be provided with the first countershaft subassembly 82 and the second countershaft subassembly 84 as will be discussed in more detail below. The first gear 92 may be operatively connected to the rotor 54 of the electric motor 22 such that the rotor 54 and the first gear 92 are rotatable together about the first axis 60. For example, the first gear 92 may be fixedly positioned with respect to the rotor 54 or fixedly coupled to the rotor 54 such that the first gear 92 does not rotate about the first axis 60 with respect to the rotor 54. In at least one configuration, the first gear 92 may be axially positioned along the first axis 60 between the second gear 94 and the electric motor 22.

The second gear 94 may receive the shaft portion 72 of the drive pinion 24. For example, the second gear 94 may have a through hole through which the shaft portion 72 may extend. The second gear 94 may extend around the first axis 60 and the shaft portion 72 and may have a plurality of teeth that may be arranged around and may face away from the first axis 60. The teeth of the second gear 94 may contact and may mate or mesh with teeth of a second countershaft gear that may be provided with the first countershaft subassembly 82 and the second countershaft subassembly 84 as will be discussed in more detail below. The second gear 94 may have a different diameter than the first gear 92 and the third gear 96. For example, the second gear 94 may have a larger diameter than the first gear 92 and a smaller diameter than the third gear 96. In at least one configuration, the second gear 94 may be axially positioned along the first axis 60 between the first gear 92 and the third gear 96.

The third gear 96 may receive the shaft portion 72 of the drive pinion 24. For example, the third gear 96 may have a through hole through which the shaft portion 72 may extend. The third gear 96 may extend around the first axis 60 and the shaft portion 72 and may have a plurality of teeth that may be arranged around and may face away from the first axis 60. The teeth of the third gear 96 may contact and may mate or mesh with teeth of a third countershaft gear that may be provided with the first countershaft subassembly 82 and the second countershaft subassembly 84 as will be discussed in more detail below. The third gear 96 may have a different diameter than the first gear 92 and the second gear 94. For example, the third gear 96 may have a larger diameter than the first gear 92 and the second gear 94. In at least one configuration, the third gear 96 be axially positioned along the first axis 60 further from the electric motor 22 than the first gear 92 and the second gear 94.

Optionally, a bearing such as a roller bearing may receive the shaft portion 72 and may rotatably support a corresponding gear. For instance, a first bearing may be received between the first gear 92 and the shaft portion 72, a second bearing may be received between the second gear 94 and the shaft portion 72, and so on to facilitate rotation of the drive pinion 24 with respect to a gear when the gear is not coupled to the drive pinion 24.

The first countershaft subassembly 82 may be at least partially received in the housing assembly 20. The first countershaft subassembly 82 may be rotatable about a first countershaft axis 100. The first countershaft axis 100 may be disposed parallel or substantially parallel to the first axis 60 in one or more embodiments. The first countershaft subassembly 82 may be spaced apart from the differential assembly 28 such that the electric motor 22 may be positioned along the first axis 60 between the first countershaft subassembly 82 and the differential assembly 28. The first countershaft subassembly 82 may include a first countershaft 110 and a plurality of gears. In the configuration shown, the plurality of gears of the first countershaft subassembly 82 include a first countershaft gear 112, a second countershaft gear 114, and a third countershaft gear 116; however, it is contemplated that a greater number of gears or a lesser number of gears may be provided.

The first countershaft 110 may be rotatable about the first countershaft axis 100. For instance, the first countershaft 110 may be rotatably supported on the housing assembly 20 by one or more roller bearing assemblies. As an example, a roller bearing assembly may be located near opposing first and second ends the first countershaft 110. The roller bearing assembly may have any suitable configuration. For instance, the roller bearing assembly may include a plurality of rolling elements that may be disposed between an inner race and an outer race. The inner race may be mounted to the first countershaft 110 and may extend around and may receive the first countershaft 110. The outer race may extend around the inner race and may be mounted to the housing assembly 20. The first countershaft 110 may support the first countershaft gear 112, the second countershaft gear 114, and the third countershaft gear 116.

The first countershaft gear 112 may be fixedly disposed on the first countershaft 110 or fixedly mounted to the first countershaft 110. As such, the first countershaft gear 112 may rotate about the first countershaft axis 100 with the first countershaft 110. For example, the first countershaft gear 112 may have a hole that may receive the first countershaft 110 and may be fixedly coupled to the first countershaft 110. The list countershaft gear 112 may extend around the first countershaft axis 100 and may have a plurality of teeth that may be arranged around and may face away from the first countershaft axis 100. The teeth of the first countershaft gear 112 may contact and may mate or mesh with the teeth of the first gear 92. In at least one configuration, the first countershaft gear 112 may be axially positioned along the first countershaft axis 100 between the second countershaft gear 114 of the first countershaft subassembly 82 and the electric motor 22.

The second countershaft gear 114 may be fixedly disposed on the first countershaft 110 or fixedly mounted to the first countershaft 110. As such, the second countershaft gear 114 may rotate about the first countershaft axis 100 with the first countershaft 110. For example, the second countershaft gear 114 may have a hole that may receive the first countershaft 110 and may be fixedly coupled to the first countershaft 110. The second countershaft gear 114 may extend around the first countershaft axis 100 and may have a plurality of teeth that may be arranged around and may face away from the first countershaft axis 100. The teeth of the second countershaft gear 114 may contact and may mate or mesh with the teeth of the second gear 94. The second countershaft gear 114 may have a different diameter than the second countershaft gear 114 and the third countershaft gear 116. In at least one configuration, the second countershaft gear 114 may be axially positioned along the first countershaft axis 100 between the first countershaft gear 112 of the first countershaft subassembly 82 and the third countershaft gear 116 of the first countershaft subassembly 82.

The third countershaft gear 116 may be fixedly disposed on the first countershaft 110 or fixedly mounted to the first countershaft 110. As such, the third countershaft gear 116 may rotate about the first countershaft axis 100 with the first countershaft 110. For example, the third countershaft gear 116 may have a hole that may receive the first countershaft 110 and may be fixedly coupled to the first countershaft 110. The third countershaft gear 116 may extend around the first countershaft axis 100 and may have a plurality of teeth that may be arranged around and may face away from the first countershaft axis 100. The teeth of the third countershaft gear 116 may contact and may mate or mesh with the teeth of the third gear 96. The third countershaft gear 116 may have a different diameter than the first countershaft gear 112 and the second countershaft gear 114. In at least one configuration, the third countershaft gear 116 may be axially positioned along the first countershaft axis 100 further from the electric motor 22 than the first countershaft gear 112 and the second countershaft gear 114 of the first countershaft subassembly 82.

The second countershaft subassembly 84 may be at least partially received in the housing assembly 20 and may be rotatable about a second countershaft axis 100'. The second countershaft axis 100' may be disposed parallel or substantially parallel to the first countershaft axis 100 in one or more embodiments. The second countershaft subassembly 84 may be spaced apart from the differential assembly 28 such that the electric motor 22 may be positioned along the first axis 60 between the second countershaft subassembly 84 and the differential assembly 28. The second countershaft subassembly 84 may generally be disposed on an opposite side of the first axis 60 from the first countershaft subassembly 82 or may be disposed directly opposite the first countershaft subassembly 82. Moreover, the second countershaft subassembly 84 may have substantially the same configuration as the first countershaft subassembly 82. For example, the second countershaft subassembly 84 may include a second countershaft 110' that may be analogous to or may have the same structure as the first countershaft 110. In addition, the second countershaft subassembly 84 may include a plurality of gears. In the configuration shown, the plurality of gears of the second countershaft subassembly 84 include a first countershaft gear 112', a second countershaft gear 114', and a third countershaft gear 116'; however, it is contemplated that a greater number of gears or a lesser number of gears may be provided. The first countershaft gear 112', a second countershaft gear 114', and a third countershaft gear 116' of the second countershaft subassembly 84 may be analogous to or may have the same structure as the first countershaft gear 112, a second countershaft gear 114, and a third countershaft gear 116, respectively, of the first countershaft subassembly 82 and may be arranged along second countershaft axis 100' rather than the first countershaft axis 100 and may be fixed to the second countershaft 110' rather than the first countershaft 110.

The first gear 92 and the first countershaft gears 112, 112' may provide a different gear ratio than the second gear 94 and the second countershaft gears 114, 114' and may provide a different gear ratio than the third gear 96 and the third countershaft gears 116, 116'. As a non-limiting example, the first gear 92 and the first countershaft gears 112, 112' may provide a gear ratio of more than 2:1, the second gear 94 and the second countershaft gears 114, 114' may provide a gear ratio from 1:1 to 2:1, and the third gear 96 and the third countershaft gears 116, 116' may provide a gear ratio of 1:1 or less. For instance, the first countershaft gears 112, 112' may have a larger diameter than the first gear 92, the second countershaft gears 114, 114' and the third countershaft gears 116, 116'. The second countershaft gears 114, 114' may have a larger diameter than the second gear 94 and the third countershaft gears 116, 116'. The third gear 96 may have the same diameter as the third countershaft gears 116, 116'.

It is also contemplated that other gear configurations may be provided. As one example, the first gear 92 may have a larger diameter than the second gear 94 and the third gear 96. As another example, gears or gear pairings may be arranged in different sequences along their respective axes. As another example, multiple meshing gear pairings or no gear pairings may provide "overdrive" gear ratios of less than 1:1. As another example, multiple meshing gear pairings may provide gear ratios of greater than 1:1. As such, gear ratios may be provided that are greater than 1:1, less than 1:1, equal (i.e., 1:1), or combinations thereof.

The teeth of the countershaft transmission gears may be of any suitable type. As a non-limiting example, the meshing teeth of the members of the set of drive pinion gears 80 and the gears of the first countershaft subassembly 82 and the second countershaft subassembly 84 may have a helical configuration.

The differential assembly 28 may be at least partially received in the center portion 42 of the housing assembly 20.

The differential assembly 28 may transmit torque to the vehicle traction wheel assemblies and permit the traction wheel assemblies to rotate at different velocities. For example, the differential assembly 28 may be operatively connected to the axle shafts 30 and may permit the axle shafts 30 to rotate at different rotational speeds about a second axis 120. The second axis 120 may be disposed perpendicular or substantially perpendicular to the first axis 60. In at least one configuration, the differential assembly 28 may include a differential case 130, a ring gear 132, a first differential gear 134, a second differential gear 136, and at least one pinion gear 138.

The differential case 130 may be configured to receive components of the differential assembly 28. In addition, the differential case 130 may be rotatable about the second axis 120. For example, the differential case 130 may be rotatably supported by a pair of roller bearing assemblies, which in turn may be mounted to a portion of the housing assembly 20, such as a differential carrier. The differential case 130 may at least partially define a cavity that may at least partially receive the first differential gear 134, second differential gear 136, and pinion gear(s) 138.

The ring gear 132 may be fixedly disposed on the differential case 130 or fixedly mounted to the differential case 130. As such, the ring gear 132 may rotate about the second axis 120 with the differential case 130. The ring gear 132 may extend around the second axis 120 and may have a plurality of teeth that may be arranged around and may face away from the second axis 120. The teeth of the ring gear 132 may contact and mate or mesh with teeth of the gear portion 70 of the drive pinion 24. As such, torque may be transmitted between the countershaft transmission 26 and the differential assembly 28 via the meshing teeth of the drive pinion 24 and the ring gear 132.

The first differential gear 134 may be disposed in the differential case 130. In addition, the first differential gear 134 may be coupled to an axle shaft 30 such that the axle shaft 30 and the first differential gear 134 are rotatable together about the second axis 120. The first differential gear 134 may be coupled to the axle shaft 30 in any suitable manner. For instance, the first differential gear 134 may have a hole that may receive the axle shaft 30 and the axle shaft 30 and first differential gear 134 may be coupled with mating splines, a weld, fastener, or the like. The first differential gear 134 may also have gear portion that may have a set of teeth that may be arranged around the second axis 120 and that may mate or mesh with teeth on one or more pinion gears 138.

The second differential gear 136 may be disposed in the differential case 130. The second differential gear 136 may be spaced apart from the first differential gear 134 and may have a similar or identical configuration as the first differential gear 134. As such, the second differential gear 136 may be coupled to another axle shaft 30 in any suitable manner such that the axle shaft 30 and the second differential gear 136 are rotatable together about the second axis 120. The second differential gear 136 may also have gear portion that may have a set of teeth that may be arranged around the second axis 120 and that may mate or mesh with teeth on one or more pinion gears 138.

At least one pinion gear 138 may be received in the differential case 130. A pinion gear 138 may include a set of teeth that mate or mesh with teeth on the first differential gear 134 and teeth on the second differential gear 136. In addition, a pinion gear 138 may be rotatable with respect to the differential case 130 or rotatably mounted on the differential case 130. For instance, a pinion gear 138 may receive and may be rotatable about a shaft or a spider that may extend from or may be mounted to the differential case 130 such that the shaft or spider is rotatable about the second axis 120 with the differential case 130.

Figure 2:
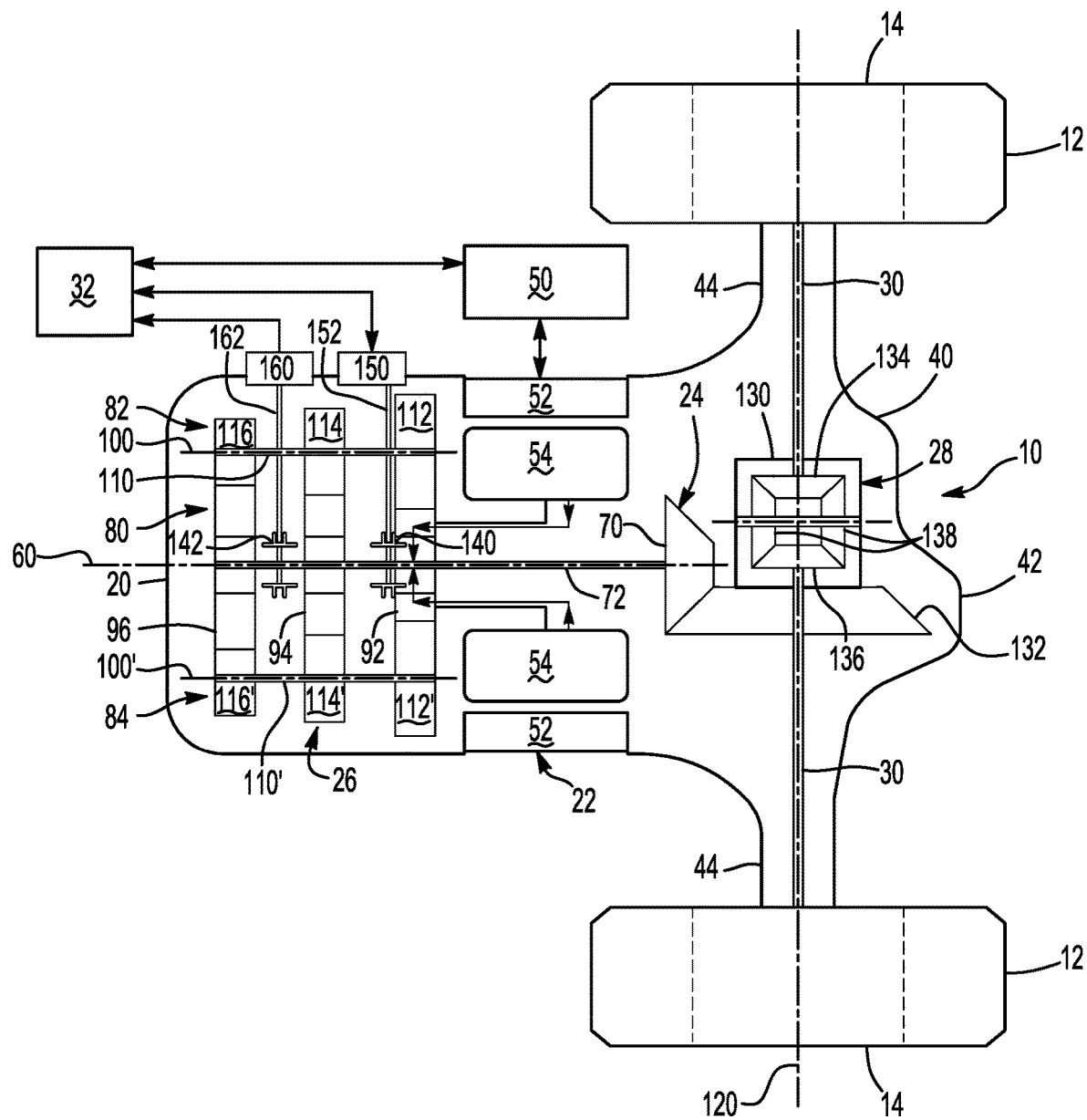
FIG. 2 illustrates the axle assembly with a first gear ratio engaged.

Referring to FIGS. 1 and 2, the axle shafts 30 may transmit torque from the differential assembly 28 to corresponding traction wheel assemblies. For example, two axle shafts 30 may be provided such that each axle shaft 30 extends into or through a different arm portion 44 of housing assembly 20. The axle shafts 30 may extend along and may be rotatable about the second axis 120. Each axle shaft 30 may have a first end and a second end. The first end may be operatively connected to the differential assembly 28. The second end may be disposed opposite the first end and may be operatively connected to a corresponding wheel end assembly that may have a wheel hub that may support a wheel 14. Optionally, gear reduction may be provided between an axle shaft and a wheel 14, such as with a gear reduction unit 36 having any suitable configuration. For instance, the gear reduction unit 36 may be configured with bevel gears or a planetary gear set in a manner known by those skilled in the art.

The control system 32 may control operation of the axle assembly 10. The control system 32 may include one or more electronic controllers, such as a microprocessor-based controller, that may monitor and/or control operation of various components of the axle assembly 10, such as the electric motor 22 and the electrical power source 50. In addition, the control system 32 may control coupling and decoupling of the gears of the set of drive pinion gears 80 to and from the drive pinion 24. For instance, the control system 32 may control operation of one or more clutches that may couple/decouple at least one member of the set of drive pinion gears 80 to/from the drive pinion 24.

A clutch may have any suitable configuration. The clutch may be configured as a disc clutch that may include friction discs that may be selectively engaged to couple a gear to a corresponding shaft. Alternatively, the clutch may be configured as a dog clutch or clutch collar that may receive, rotate with, and slide along a corresponding shaft to selectively couple and decouple one or more members of the set of drive pinion gears 80 to the drive pinion 24. For example, a clutch that is configured as a dog clutch or a clutch collar may have a through hole that may receive the shaft portion 72 of the drive pinion 24 and may rotate about the first axis 60 with the shaft portion 72. For instance, the clutch and shaft portion 72 may have mating splines that inhibit rotation of the clutch with respect to the shaft portion 72 while allowing the clutch to slide in an axial direction along the first axis 60 with respect to the shaft portion 72 to engage or disengage a member of the set of drive pinion gears 80. Such a clutch may have a tooth or teeth that may be configured to selectively mate or mesh with corresponding teeth on a member of the set of drive pinion gears 80 to couple the gear to the shaft portion 72 such that the gear rotates about the first axis 60 with the drive pinion 24. The tooth or teeth of the clutch may be configured as a face gear that may be disposed along a lateral side of the clutch or may be configured like a spline and may be received inside a hole of a member of the set of drive pinion gears 80. Clutches will primarily be described below as having a dog clutch or clutch collar configuration; however, it is to be understood that a clutch may have a different configuration and may not be configured as a dog clutch or a clutch collar, that a different number of clutches may be provided, and that clutches may be associated with a single member of the set of drive pinion gears 80 rather than multiple drive pinion gears or vice versa.

In at least one configuration, a first clutch 140 and a second clutch 142 may be provided. The first clutch 140 may be axially positioned along the first axis 60 between the first gear 92 and the second gear 94 while the second clutch 142 may be axially positioned between the second gear 94 and the third gear 96. The first clutch 140 and the second clutch 142 may be configured to selectively couple a single gear or multiple gears to the drive pinion 24 as will be discussed in more detail below. It is contemplated that a single actuator may be provided to actuate multiple clutches, like the first clutch 140 and the second clutch 142 or that different actuators may actuate different clutches.

The first clutch 140 may be operatively connected to a first actuator 150 that may be configured to move the first clutch 140 along the first axis 60. For example, a linkage 152, such as a shift fork, may operatively connect the first clutch 140 to the first actuator 150. The first actuator 150 may be of any suitable type. For example, the first actuator 150 may be an electrical, electromechanical, pneumatic, or hydraulic actuator. In at least one configuration, such as when the first clutch 140 is a clutch collar or dog clutch, the first actuator 150 may move the first clutch 140 along the first axis 60 and may execute a shift when the rotational speed of the first clutch 140 and a corresponding member of the set of drive pinion gears 80 are sufficiently synchronized to complete a shift so that the teeth of the first clutch 140 may mesh with teeth on a drive pinion gear or so that the teeth of the first clutch 140 gear may disengage from teeth on a drive pinion gear. The control system 32 may monitor and/or control operation of the first actuator 150.

The second clutch 142 may be operatively connected to a second actuator 160 that may be configured to move the second clutch 142 along the first axis 60. It is also contemplated that a single actuator may be provided to actuate multiple clutches, like the first clutch 140 and the second clutch 142. For example, a linkage 162, such as a shift fork, may operatively connect the second clutch 142 to the second actuator 160. The second actuator 160 may be of any suitable type. For example, the second actuator 160 may be an electrical, electromechanical, pneumatic, or hydraulic actuator. In at least one configuration, such as when the second clutch 142 is a clutch collar or dog clutch, the second actuator 160 may move the second clutch 142 along the first axis 60 and may execute a shift when the rotational speed of the second clutch 142 and a corresponding member of the set of drive pinion gears 80 are sufficiently synchronized to complete a shift so that the teeth of the second clutch 142 may mesh with teeth on a drive pinion gear or so that the teeth of the second clutch 142 gear may disengage from teeth on a drive pinion gear. The control system 32 may monitor and/or control operation of the second actuator 160.

Sufficient synchronization to permit shifting or movement of a clutch, like the first clutch 140 or the second clutch 142, may be attained using a gear synchronizer, by controlling the rotational speed of the rotor 54, or combinations thereof. Such synchronization components or control actions may be omitted with different clutch configurations, such as a clutch that is a disc clutch.

Referring to FIGS. 1-4, examples of different clutch positions are shown. The control system 32 may actuate the first clutch 140 and the second clutch 142 to a desired position based on an operator input or an automated shift control routine. The first countershaft 110, second countershaft 110', and countershaft transmission gears that are coupled to the first countershaft 110 and the second countershaft 110' may rotate about their respective countershaft axes when the first gear 92 rotates about the first axis 60 in the clutch positions described below.

Referring to FIG. 1, the first clutch 140 and the second clutch 142 are shown in neutral positions. The first clutch 140 may not couple a gear of the set of drive pinion gears 80 to the drive pinion 24 when the first clutch 140 is in the neutral position. For instance, the first clutch 140 may not couple the first gear 92 or the second gear 94 to the drive pinion 24 when the first clutch 140 is in the neutral position. Likewise, the second clutch 142 may not couple a gear of the set of drive pinion gears 80 to the drive pinion 24 when the second clutch 142 is in the neutral position. For instance, the second clutch 142 may not couple the second gear 94 or the third gear 96 to the drive pinion 24 when the second clutch 142 is in the neutral position. The drive pinion 24 may be free to rotate about the first axis 60 with respect to at least one member of the set of drive pinion gears 80 when a clutch is in the neutral position and may be free to rotate about the first axis 60 with respect to all members of the set of drive pinion gears 80 when all clutches are in their respective neutral positions. Thus, torque is not transmitted between the electric motor 22 and the drive pinion 24 when the first clutch 140 and the second clutch 142 are in their respective neutral positions.

Figure 3A:
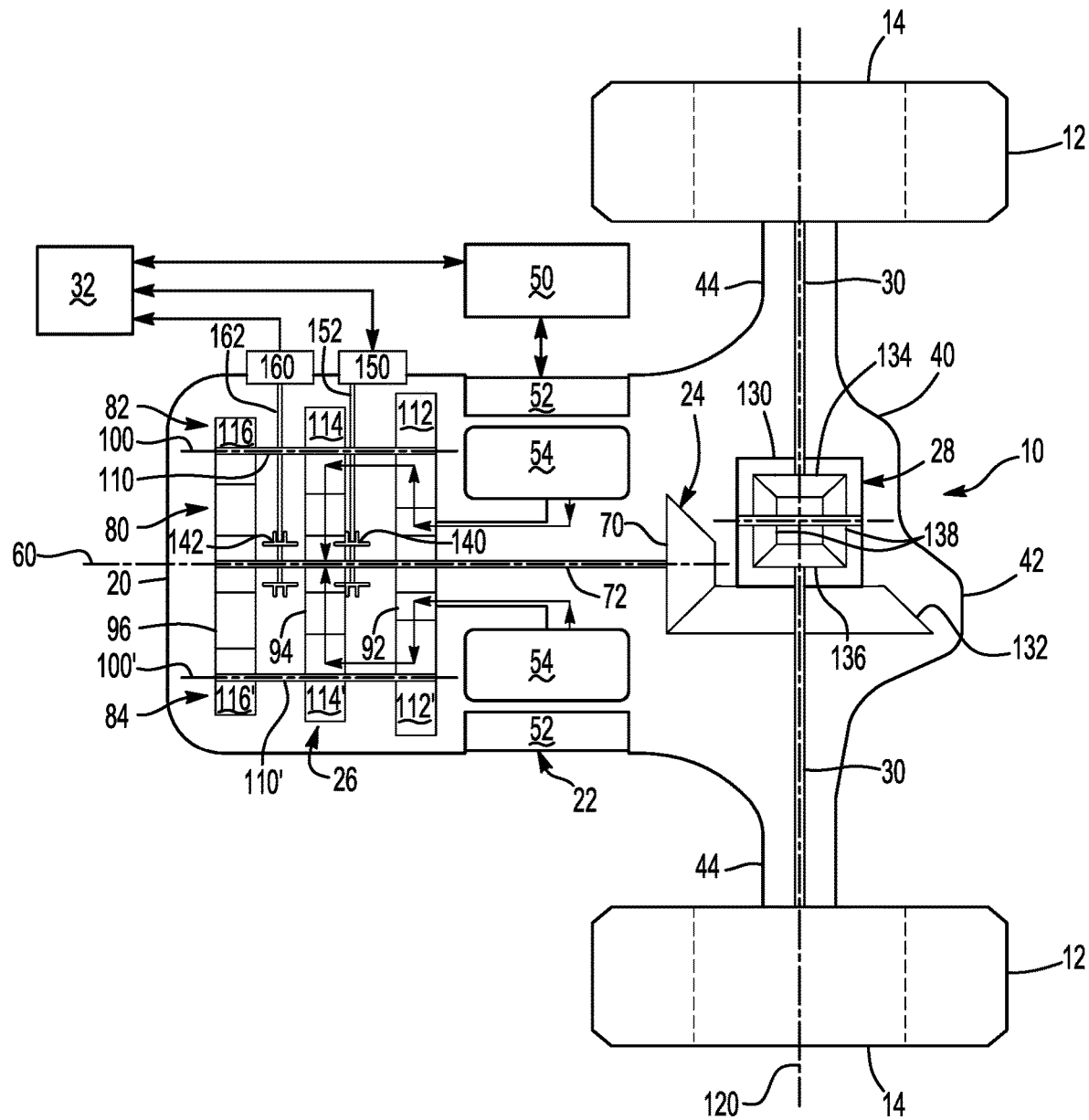
FIGS. 3A and 3B illustrate the axle assembly with a second gear ratio engaged.
Figure 3B:
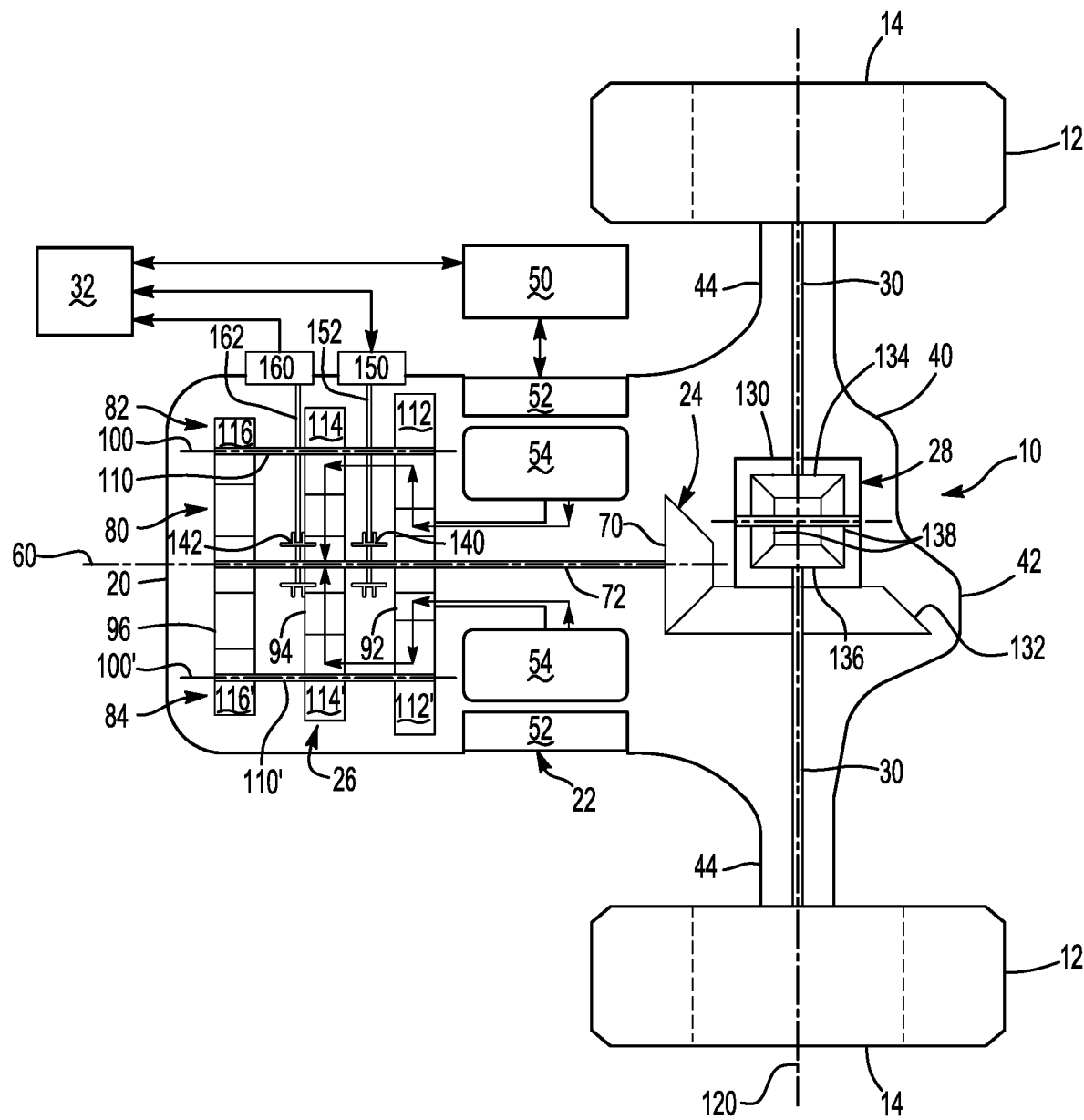
Figure 4:
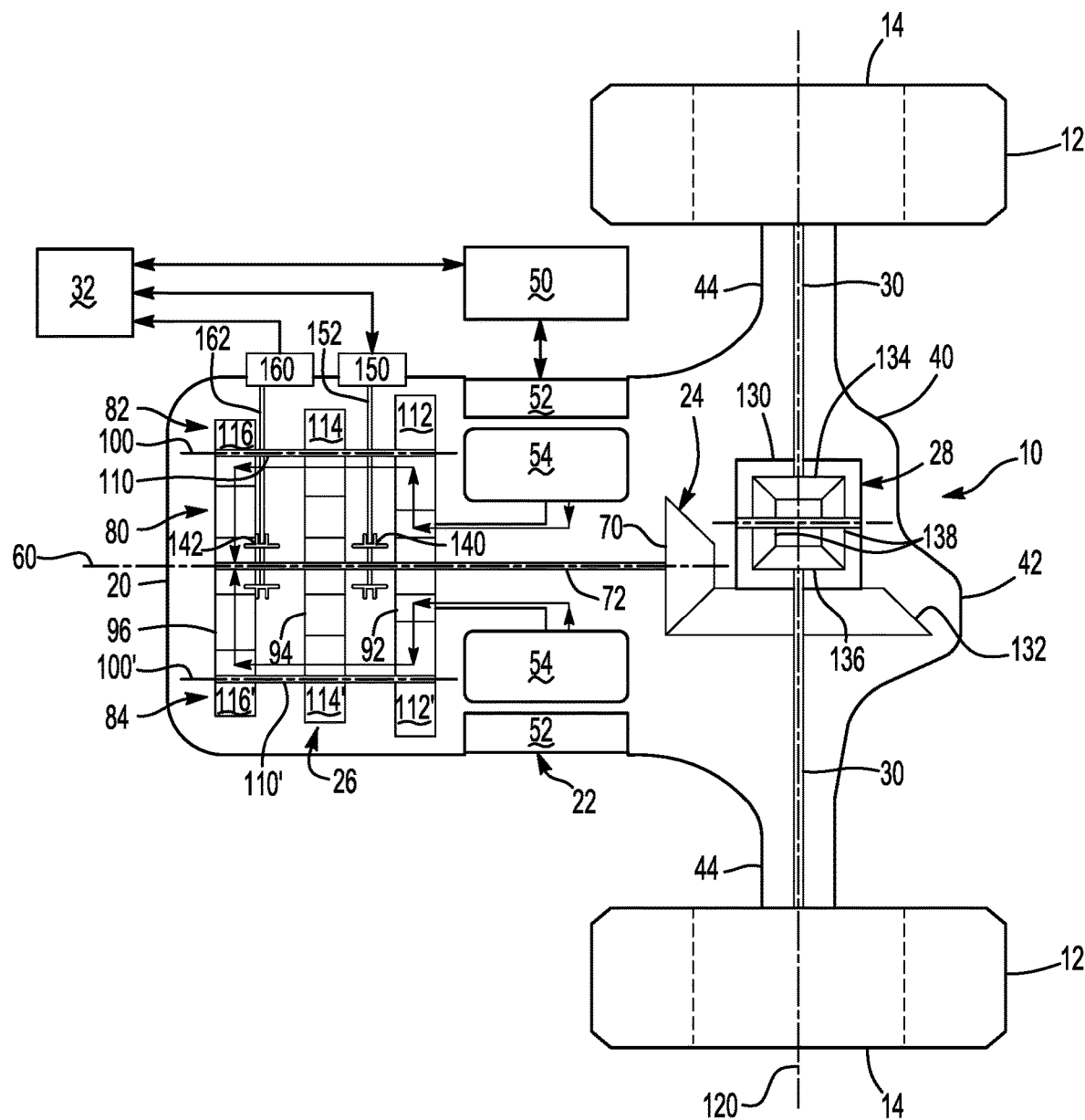
FIG. 4 illustrates the axle assembly with a third gear ratio engaged.

As an overview of the configurations shown in FIGS. 2-4, torque may be transmitted between the electric motor 22 and the drive pinion 24 when one member of the set of drive pinion gears 80 is coupled to the drive pinion 24 by a corresponding clutch and the other members of the set of drive pinion gears 80 are decoupled from the drive pinion 24 such that the drive pinion 24 is free to rotate about the first axis 60 with respect to a decoupled drive pinion gear. The straight arrowed lines in FIGS. 2-4 that are not shown in FIG. 1 depict the torque transmission path from the electric motor 22 to the drive pinion 24, and hence to the differential assembly 28; however, it is to be understood that the torque transmission path may be reversed in each of these figures and torque may be transmitted from the differential assembly 28 to the drive pinion 24 and then to the electric motor 22 via the countershaft transmission 26.

Referring to FIG. 2, the first clutch 140 is shown in a first position and the second clutch 142 is shown in the neutral position. The first clutch 140 may be moved to the first position by the first actuator 150. In the first position, the first clutch 140 may couple the first gear 92 to the drive pinion 24 such that the first gear 92 rotates about the first axis 60 with the drive pinion 24. Thus, the rotor 54, the first gear 92, and the drive pinion 24 are rotatable together about the first axis 60. The second gear 94 and the third gear 96 are not coupled to the drive pinion 24 by a clutch. Accordingly, rotation of the first gear 92 may cause the first countershaft 110 and the second countershaft 110' to rotate about the first countershaft axis 100 and the second countershaft axis 100', respectively, but torque may not be transmitted to or from the drive pinion 24 via the second gear 94 or the third gear 96 since these gears are decoupled from the drive pinion 24. Thus, torque may be transmitted between the electric motor 22 and the drive pinion 24 via the first gear 92 when the first clutch 140 couples the first gear 92 to the drive pinion 24 such that the first gear 92 rotates about the first axis 60 with the drive pinion 24. A first gear ratio is provided when the first gear 92 is coupled to the drive pinion 24.

Referring to FIGS. 3A and 3B, two different examples are shown that illustrate the transmission of torque via the second gear 94. In FIGS. 3A and 3B, a second gear ratio is provided when the second gear 94 is coupled to the drive pinion 24. The second gear ratio may differ from the first gear ratio.

In FIG. 3A, the first clutch 140 is shown in a second position and the second clutch 142 is shown in the neutral position. The first clutch 140 may be moved to the second position by the first actuator 150. In the second position, the first clutch 140 couples the second gear 94 to the drive pinion 24 such that the second gear 94 rotates about the first axis 60 with the drive pinion 24. Accordingly, rotation of the first gear 92 may cause the first countershaft 110 and the second countershaft 110' to rotate about the first countershaft axis 10 and the second countershaft axis 100', respectively, and torque may be transmitted to or from the drive pinion 24 via the second countershaft gears 114, 114', the first clutch 140, and the second gear 94. The first gear 92 and the third gear 96 are not coupled to the drive pinion 24 via the first clutch 140 or the second clutch 142. Thus, torque may not be transmitted to or from the drive pinion 24 via the first gear 92 and the third gear 96 since these gears are decoupled from the drive pinion 24. Therefore, torque is transmitted between the electric motor 22 and the drive pinion 24 via the second gear 94 when the first clutch 140 does not couple the first gear 92 to the drive pinion 24 and the first clutch 140 couples the second gear 94 to the drive pinion 24 such that the second gear 94 rotates about the first axis 60 with the drive pinion 24.

In FIG. 3B, the second clutch 142 is shown in a first position and the first clutch 140 is shown in the neutral position. The second clutch 142 may be moved to the first position by the second actuator 160. In the first position, the second clutch 142 couples the second gear 94 to the drive pinion 24 such that the second gear 94 rotates about the first axis 60 with the drive pinion 24. Accordingly, rotation of the first gear 92 may cause the first countershaft 110 and the second countershaft 110' to rotate about the first countershaft axis 100 and the second countershaft axis 100', respectively, and torque may be transmitted to or from the drive pinion 24 via the second countershaft gears 114, 114', the second clutch 142, and the second gear 94. The first gear 92 and the third gear 96 are not coupled to the drive pinion 24 via the first clutch 140 or the second clutch 142. Thus, torque may not be transmitted to or from the drive pinion 24 via the first gear 92 and the third gear 96 since these gears are decoupled from the drive pinion 24. Therefore, torque is transmitted between the electric motor 22 and the drive pinion 24 via the second gear 94 when the first clutch 140 does not couple the first gear 92 to the drive pinion 24 and the second clutch 142 couples the second gear 94 to the drive pinion 24 such that the second gear 94 rotates about the first axis 60 with the drive pinion 24.

In FIG. 4, the second clutch 142 is shown in a second position and the first clutch 140 is shown in the neutral position. The second clutch 142 may be moved to the second position by the second actuator 160. In the second position, the second clutch 142 couples the third gear 96 to the drive pinion 24 such that the third gear 96 rotates about the first axis 60 with the drive pinion 24. Accordingly, rotation of the first gear 92 may cause the first countershaft 110 and the second countershaft 110' to rotate about the first countershaft axis 100 and the second countershaft axis 100', respectively, and torque may be transmitted to or from the drive pinion 24 via the third countershaft gears 116, 116', the second clutch 142, and the third gear 96. The first gear 92 and the second gear 94 are not coupled to the drive pinion 24 via the first clutch 140 or the second clutch 142. Thus, torque may not be transmitted to or from the drive pinion 24 via the first gear 92 and the second gear 94 since these gears are decoupled from the drive pinion 24. Therefore, torque is transmitted between the electric motor 22 and the drive pinion 24 via the third gear 96 when the first clutch 140 does not couple the first gear 92 or the second gear 94 to the drive pinion 24 and the second clutch 142 couples the third gear 96 to the drive pinion 24 such that the third gear 96 rotates about the first axis 60 with the drive pinion 24. A third gear ratio is provided when the third gear 96 is coupled to the drive pinion 24. The third gear ratio may differ from the first gear ratio and the second gear ratio.

The axle assembly configurations discussed above may help provide an axle assembly in which the electric motor and countershaft transmission are arranged on the same side of a differential assembly and axle shafts, which may help meet vehicle packaging requirements. Moreover, the electric motor may be centered between the differential assembly and the countershaft transmission, which may help improve weight distribution and/or provide a short coupling distance between the electric motor and the countershaft transmission. The axle assembly may accommodate a wide range of gear ratios, including gear ratios less than 1:1. greater than 4:1 or both. In addition, the axle assembly may allow an electric motor to be coupled to existing axle housing configurations, which may reduce tooling and development costs. In addition, the configurations described above may allow a modular countershaft transmission to be provided with multiple gears mounted to a corresponding countershaft without independent bearings for associated gears.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor;
   a drive pinion that is rotatable about a first axis; and
   a countershaft transmission that operatively connects the electric motor to the drive pinion, the countershaft transmission having a first countershaft subassembly that is rotatable about a first countershaft axis and a second countershaft subassembly that is rotatable about a second countershaft axis, wherein the first countershaft subassembly includes first, second, and third countershaft gears that are fixedly mounted to a first countershaft and the second countershaft subassembly includes first, second, and third countershaft gears that are fixedly mounted to a second countershaft; and
   a set of drive pinion gears that include first, second, and third gears that receive the drive pinion, wherein the first, second, and third gears mesh with the first, second, and third countershaft gears of the first countershafts subassembly respectively, and mesh with the first, second, and third countershaft gears of the second countershaft subassembly, respectively;
   a first clutch that selectively couples the first gear to the drive pinion; and
   a second clutch that selectively couples the third gear to the drive pinion, wherein torque is not transmitted between the electric motor and the drive pinion when the first clutch is in a neutral position in which the first gear is rotatable about the first axis with respect to the drive pinion and the second clutch is in a neutral position in which the second gear and the third gear are rotatable about the first axis with respect to the drive pinion.

2. The axle assembly of claim 1 further comprising a differential assembly that is rotatable about a second axis, wherein the differential assembly is operatively connected to the drive pinion.

3. The axle assembly of claim 2 wherein the electric motor is positioned along the first axis between the countershaft transmission and the differential assembly.

4. The axle assembly of claim 1 wherein the electric motor has a rotor that is operatively connected to the first gear, the drive pinion extends through the first gear, and the rotor and the first gear being are rotatable together about the first axis.

5. The axle assembly of claim 1 wherein torque is transmitted between the electric motor and the drive pinion via the first gear when the first clutch couples the first gear to the drive pinion such that the first gear rotates about the first axis with the drive pinion.

6. The axle assembly of claim 1 wherein the first countershaft and the first countershaft gear of the first countershaft subassembly are rotatable about the first countershaft axis, and the second countershaft and the first countershaft gear of the second countershaft subassembly are rotatable about the second countershaft axis.

7. The axle assembly of claim 1 wherein the drive pinion extends through the second gear.

8. The axle assembly of claim 1 wherein the first gear is positioned along the first axis between the second gear and the electric motor.

9. The axle assembly of claim 1 wherein the second countershaft gear of the first countershaft subassembly is rotatable about the first countershaft axis, and the second countershaft gear of the second countershaft subassembly is rotatable about the second countershaft axis.

10. The axle assembly of claim 1 wherein the first clutch selectively couples the second gear to the drive pinion, and wherein torque is transmitted between the electric motor and the drive pinion via the second gear when the first clutch does not couple the first gear to the drive pinion and the first clutch couples the second gear to the drive pinion such that the second gear rotates about the first axis with the drive pinion.

11. The axle assembly of claim 1 wherein the first clutch selectively couples the first gear to the drive pinion, the second clutch selectively couples the second gear to the drive pinion, and torque is transmitted between the electric motor and the drive pinion via the second gear when the first clutch does not couple the first gear to the drive pinion and the second clutch couples the second gear to the drive pinion such that the second gear rotates about the first axis with the drive pinion.

12. The axle assembly of claim 1 wherein the drive pinion extends through the third gear.

13. The axle assembly of claim 1 wherein the second gear is positioned along the first axis between the first gear and the third gear.

14. The axle assembly claim 1 wherein the drive pinion extends through the first clutch, the first clutch is rotatable about the first axis with the drive pinion and is moveable along the first axis to selectively couple the first gear or the second gear to the drive pinion, wherein at least a portion of the first clutch is received inside the first gear when the first clutch couples the first gear to the drive pinion and at least a portion of the first clutch is received inside the second gear when the first clutch couples the second gear couples the second gear to the drive pinion.

15. The axle assembly of claim 14 wherein a first gear ratio is provided when the first gear is coupled to the drive pinion, a second gear ratio is provided when the second gear is coupled to the drive pinion, and a third gear ratio is provided when the third gear is coupled to the drive pinion, wherein the first gear ratio differs from the second gear ratio and the third gear ratio, and the second gear ratio differs from the third gear ratio.

16. The axle assembly of claim 1 wherein torque is transmitted between the electric motor and the drive pinion via the third gear when the first clutch does not couple the first gear to the drive pinion and the second clutch couples the third gear to the drive pinion such that the third gear rotates about the first axis with the drive pinion.

17. The axle assembly of claim 16 wherein torque is transmitted between the electric motor and the drive pinion via the third gear when the second clutch does not couple the second gear to the drive pinion.

18. The axle assembly of claim 16 wherein the first clutch is axially positioned between the first gear and the second gear and the second clutch is axially positioned between the second gear and the third gear, wherein the first clutch receives the drive pinion and is rotatable about the first axis with the drive pinion and the second clutch receives the drive pinion and is rotatable about the first axis with the drive pinion.

19. An axle assembly comprising:
an electric motor;
a drive pinion that is rotatable about a first axis; and
a countershaft transmission that operatively connects the electric motor to the drive pinion, the countershaft transmission having a first countershaft subassembly that is rotatable about a first countershaft axis and a second countershaft subassembly that is rotatable about a second countershaft axis, wherein the first countershaft subassembly includes first, second, and third countershaft gears that are fixedly mounted to a first countershaft and the second countershaft subassembly includes first, second, and third countershaft gears that are fixedly mounted to a second countershaft;
a set of drive pinion gears that include first, second, and third gears that receive the drive pinion, wherein the first, second, and third gears mesh with the first, second, and third countershaft gears of the first countershaft subassembly, respectively, and mesh with the first, second, and third countershaft gears of the second countershaft subassembly, respectively;
a first clutch that selectively couples the first gear to the drive pinion; and
a second clutch that selectively couples the third gear to the drive pinion, wherein torque is transmitted between the electric motor and the drive pinion via the third gear when the first clutch does not couple the first gear to the drive pinion and the second clutch couples the third gear to the drive pinion such that the third gear rotates about the first axis with the drive pinion, wherein a first actuator actuates the first clutch along the first axis and a second actuator actuates the second clutch along the first axis.

20. The axle assembly of claim 19 wherein the electric motor has a rotor that is operatively connected to the first gear, the drive pinion extends through the first gear, and the rotor and the first gear are rotatable together about the first axis.

* * * * *

UNITED STATES PATENT AND TRADEMARK OFFICE
CERTIFICATE OF CORRECTION

PATENT NO. : 11,207,976 B2  
APPLICATION NO. : 16/594362  
DATED : December 28, 2021  
INVENTOR(S) : Ghatti et al.

Page 1 of 1

It is certified that error appears in the above-identified patent and that said Letters Patent is hereby corrected as shown below:

In the Claims

Column 13, Line 67 to Column 14, Line 1, Claim 14:  
After "the first clutch is received inside the second gear when the first clutch couples"  
Delete "the second gear couples"

Signed and Sealed this  
Twenty-eighth Day of June, 2022

Katherine Kelly Vidal  
*Director of the United States Patent and Trademark Office*